US009154525B2

(12) United States Patent
Hikabe

(10) Patent No.: US 9,154,525 B2
(45) Date of Patent: Oct. 6, 2015

(54) SIP TERMINAL CONTROL SYSTEM AND SIP TERMINAL CONTROL METHOD

(75) Inventor: Akinori Hikabe, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 333 days.

(21) Appl. No.: 13/576,111

(22) PCT Filed: Jan. 19, 2011

(86) PCT No.: PCT/JP2011/050811
§ 371 (c)(1),
(2), (4) Date: Jul. 30, 2012

(87) PCT Pub. No.: WO2011/093178
PCT Pub. Date: Aug. 4, 2011

(65) Prior Publication Data
US 2013/0007179 A1    Jan. 3, 2013

(30) Foreign Application Priority Data

Feb. 1, 2010  (JP) .................................. 2010-020200

(51) Int. Cl.
G06F 15/16 (2006.01)
G06F 13/00 (2006.01)
H04L 29/06 (2006.01)
(52) U.S. Cl.
CPC .................................. *H04L 65/1006* (2013.01)
(58) Field of Classification Search
CPC .............. H04L 41/104; H04L 65/0023; H04L 65/1006
USPC ....................................................... 709/208
See application file for complete search history.

(56) References Cited

U.S. PATENT DOCUMENTS

| 2006/0090001 | A1* | 4/2006 | Collins | ........................ 709/230 |
| 2007/0121887 | A1 | 5/2007 | Nakai | |
| 2008/0288686 | A1* | 11/2008 | Hikabe | ........................ 710/110 |
| 2009/0287954 | A1 | 11/2009 | Hikabe | |

FOREIGN PATENT DOCUMENTS

| CN | 101355559 A | 1/2009 |
| EP | 1993232 A | 11/2008 |
| JP | 64-064495 A | 3/1989 |

(Continued)

OTHER PUBLICATIONS

Communication dated Jan. 28, 2014, issued by the State Intellectual Property Office of the People's Republic of China in corresponding Application No. 201180007997.8.

*Primary Examiner* — Kevin Bates
*Assistant Examiner* — Emad Siddiqi
(74) *Attorney, Agent, or Firm* — Sughrue Mion, PLLC

(57) ABSTRACT

An SIP terminal control system makes it possible for SIP terminals to be connected to the system including a master main device and one or more slave main devices. The SIP terminal control system includes the master main device and slave main devices connected to the master main device. The master main device includes multilink sections each corresponding to the master main device or to each of the slave main devices. The master main device and the slave main devices each include an SIP terminal connecting section which connects SIP terminals. The multilink sections and the SIP terminal connecting sections are connected to each other by an SIP link. The multilink sections operate by using a CPU of the master main device. The SIP terminal connecting sections each operate by using a CPU of the slave main device or master main device that contains the SIP terminal connecting section.

6 Claims, 2 Drawing Sheets

(56) References Cited

FOREIGN PATENT DOCUMENTS

| | | |
|---|---|---|
| JP | 2000-165431 A | 6/2000 |
| JP | 2007-88894 A | 4/2007 |
| JP | 2007-134967 A | 5/2007 |
| JP | 2009-3923 A | 1/2009 |
| JP | 2009-175939 A | 8/2009 |

* cited by examiner

SIP TERMINAL CONTROL SYSTEM AND SIP TERMINAL CONTROL METHOD

CROSS REFERENCE TO RELATED APPLICATIONS

This application is a National Stage of International Application No. PCT/JP2011/050811 filed on Jan. 19, 2011, which claims priority from Japanese Patent Application No. 2010-020200, filed on Feb. 1, 2010, the contents of all of which are incorporated herein by reference in their entirety.

TECHNICAL FIELD

The present invention relates to an SIP terminal control system and an SIP terminal control method in a system including a master main device and one or more slave main devices.

BACKGROUND ART

In an invention disclosed in PTL 1, a physical package included in a slave main device is used as a package for controlling a digital terminal and a digital line. The physical package included in the slave main device uses a correspondence table to be associated with a virtual slot included in a master main device. Then the master main device utilizes the association to thereby control the digital terminal and digital line which are connected with the physical package of the slave main device. The physical package included in each slave main device uses a CPU of the corresponding slave main device to control the digital terminal and the like, so that processing for such control can be avoided from being concentrated on a CPU of the master main device.

CITATION LIST

Patent Literature

{PTL 1} JP-A-2009-003923

SUMMARY OF INVENTION

Technical Problem

By the way, SIP terminals can be also connected to the system including the master main device and one or more slave main devices. As such, versatility and availability of this system can be enhanced significantly.

However, each of the SIP terminals may not be connected with the physical package of the slave main device. The master main device directly controls the SIP terminals, so that processing for controlling the SIP terminals are concentrated on the CPU of the master main device. Further, in order to control the individual SIP terminals, heavy load processing such as message processing is required. Thus, the number of the SIP terminals that can be connected to the system including the master main device and one or more slave main devices is considerably restricted.

An object of the present invention is therefore to provide an SIP terminal control system and an SIP terminal control method that make it possible for multiple SIP terminals to be connected to a system including a master main device and one or more slave main devices.

Solution to Problem

According to a first aspect of the present invention, there is provided an SIP terminal control system for a system including a master main device and one or more slave main devices connected to the master main device. The master main device includes a plurality of multilink sections each corresponding to the master main device or to each of the slave main devices, the master main device and the slave main devices each include an SIP terminal connecting section which connects one or more SIP terminals, the multilink sections and the SIP terminal connecting sections are connected to each other by an SIP link, the multilink sections operate by using a CPU of the master main device, and the SIP connecting each operate by using a CPU of the slave main device or master main device that contains the SIP connecting.

According to a second aspect of the present invention, there is provided an SIP terminal control method for a system including a master main device and one or more slave main devices connected to the master main device, the method comprising: generating, in the master main device, a plurality of multilink sections each corresponding to the master main device or to each of the slave main devices; generating, in the master main device and each of the slave main devices, an SIP terminal connecting section which connects one or more SIP terminals; connecting the multilink sections and the SIP terminal connecting sections each other by an SIP link; making the multilink sections operate by using a CPU of the master main device; and making the SIP connecting sections each operate by using a CPU of the slave main device or master main device that contains the SIP connecting section.

Advantageous Effects of Invention

According to an exemplary advantage of the present invention, control for the SIP terminal can be distributed to a plurality of main devices to reduce a CPU load of each main device, making it possible for multiple SIP terminals to be connected to a system including a master main device and one or more slave main devices.

DESCRIPTION OF EMBODIMENTS

An exemplary embodiment for exploiting the present invention will be described in detail below with reference to the accompanying drawings.

Figure 1:
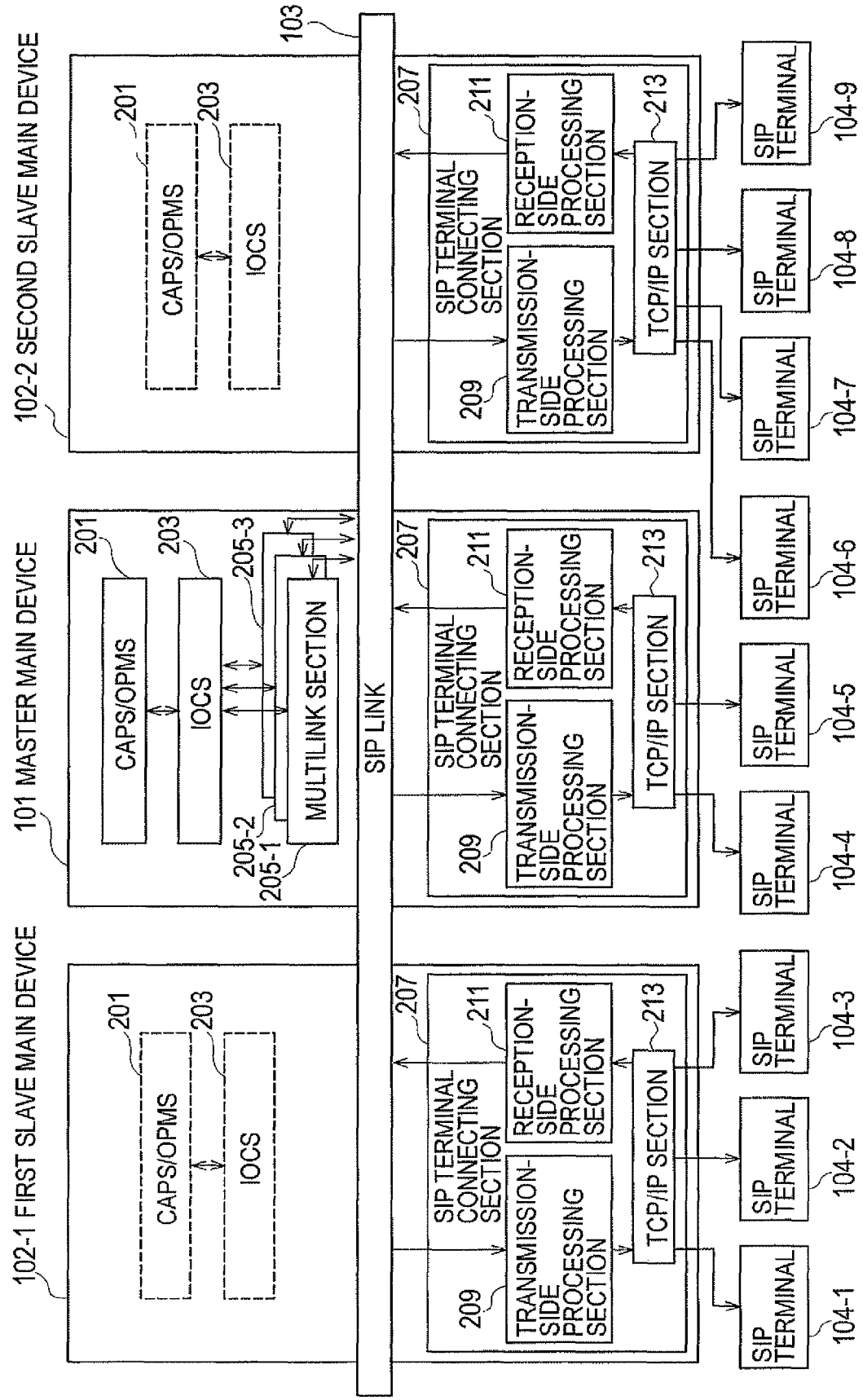
FIG. 1 A block diagram illustrating a configuration of a system including an SIP terminal control system according to an exemplary embodiment of the present invention and including a master main device and one or more slave main devices.
Figure 2:
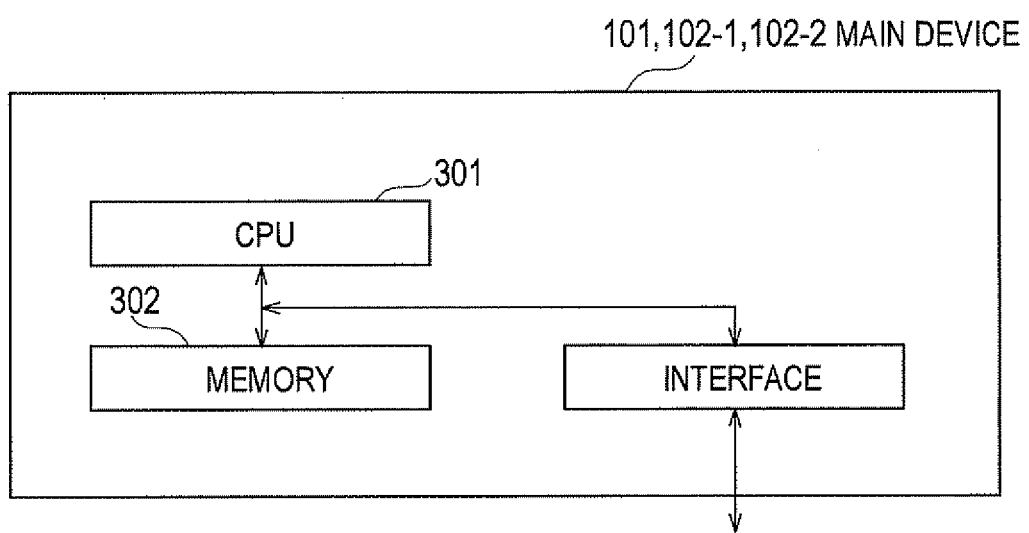
FIG. 2 A block diagram illustrating hardware configurations of the respective main devices.

As illustrated in FIG. 1, a system according to the exemplary embodiment of the present invention includes a master main device 101, a first slave main device 102-1, a second slave main device 102-2, and SIP terminals 104-1 to 104-9.

The number of the master main device 101 is one, and the number of the slave main devices is two in the example of FIG. 1, but may be any number other than two.

The master main device 101, the first slave main device 102-1, and the second slave main device 102-2 are connected to each other via an SIP link 103. The SIP link 103 passes communication messages between the main devices.

In the example of FIG. 1, the master main device 101 is connected with two SIP terminals 104-4 and 104-5 on TCP/IP. The first slave main device 102-1 is connected with three SIP terminals 104-1 to 104-3 on TCP/IP. The second slave main device 102-2 is connected with four SIP terminals 104-6 to 104-9. The number of the SIP terminals to be connected to each of the main devices is arbitrary.

The master main device 101 includes a CAPS/OPMS 201, an IOCS 203, multilink sections 205-1 to 205-3, and an SIP terminal connecting section 207. The number "3" of the multilink sections 205 corresponds to the number "3" of the main devices. Therefore, when the slave main device is newly added to the system, the multilink section 205 is added correspondingly.

A CAPS of the CAPS/OPMS 201 is a call control module, and an OPMS of the CAPS/OPMS 201 is a package and terminal management module. The package refers to, e.g., the SIP terminal connecting section 207. The IOCS is an input/output control module.

As described above, the number of the multilink sections 205 is the same as the number of the main devices included in the system. Then the multilink sections 205 each link the IOCS 203 and one SIP terminal connecting section 207 through the SIP link 103.

The SIP terminal connecting section 207 includes a transmission-side processing section 209, a reception-side processing section 211, and a TCP/IP section 213.

The transmission-side processing section 209 generates an SIP message composed of texts based on binary data transmitted from the multilink section 205 and transmits the SIP message to the TCP/IP section 213.

The reception-side processing section 211 analyzes the SIP message received from the TCP/IP section 213 and transmits a result of the analysis to the multilink section 205 in a form of a text message.

The TCP/IP section 213 passes the SIP message between the transmission-side processing section 209 and SIP terminals 104 and between the reception-side processing section 211 and SIP terminals 104.

The CAPS/OPMS 201, the IOCS 203, and the multilink sections 205-1 to 205-3 are realized by a CPU 301 of the master main device 101 executing a program for allowing the CPU of the master main device 101 to function as the above sections. This program is stored in a memory 302 of the master main device 101.

The SIP terminal connecting section 207 of the master main device 101 is realized by the CPU 301 of the master main device 101 executing a program for allowing the CPU 301 of the master main device 101 to function as the SIP terminal connecting section 207. This program is also stored in the memory 302 of the master main device 101.

The SIP terminal connecting section 207 of the first slave main device 102-1 is realized by the CPU 301 of the first slave main device 102-1 executing a program for allowing the CPU 301 of the first slave main device 102-1 to function as the SIP terminal connecting section 207. This program is stored in a memory 302 of the first slave main device 102-1.

The SIP terminal connecting section 207 of the second slave main device 102-2 is realized by the CPU 301 of the second slave main device 102-2 executing a program for allowing the CPU 301 of the second slave main device 102-2 to function as the SIP terminal connecting section 207. This program is stored in a memory 302 of the second slave main device 102-2.

The above sections are each obtained by instantiating classes in the program within the memory 302.

The CAPS/OPMS 201 and IOCS 203 are also generated in the first slave main device 102-1. While the master main device 101 normally operates, the CAPS/OPMS 201 and IOCS 203 of the first slave main device 102-1 is in a standby state; on the other hand, when the master main device 101 has gone down, the CAPS/OPMS 201 and IOCS 203 of the first slave main device 102-1 enters an operating state. At this time, the multilink section 205 is also generated in the first slave main device 102-1.

The second slave main device has the same as configuration of the first slave main device.

INDUSTRIAL APPLICABILITY

The present invention can be utilized for allowing one or more SIP terminals to be connected to a system including a plurality of main devices. The whole or part of the exemplary embodiments disclosed above can be described as, but not limited to, the following supplementary notes.

(Supplementary note 1) An SIP terminal control system in a system including a master main device and one or more slave main devices connected to the master main device, including: a plurality of multilink sections which are included in the master main device, and are operated by using a CPU of the master main device, wherein each of the plurality of multilink sections corresponds to the master main device or to each of the slave main devices respectively; and a plurality of SIP terminal connecting sections which are included in the master main device or the slave main devices, and are connected with one or more SIP terminals, wherein each of the SIP terminal connecting sections is linked with each of the multilink sections through an SIP link, each of the SIP terminal connecting sections is operated by using a CPU of the master main device in a case where the SIP terminal connecting section oneself is included in the master main device, and by using a CPU of the slave main device in a case where the SIP terminal connecting section oneself is included in the slave main device, and each of the SIP terminal connecting sections is connected, via the multilink section corresponding to each of the SIP terminal connecting sections, to a package/terminal management module and an input/output control module which are included in the master main device.

(Supplementary note 2) The SIP terminal control system according to supplementary note 1, wherein the SIP terminal connecting sections each include at least a transmission-side processing section and a reception-side processing section, and the transmission-side processing section generates an SIP message composed of texts based on binary data transmitted from the corresponding multilink section.

(Supplementary note 3) The SIP terminal control system according to supplementary note 2, wherein the reception-side processing section analyzes the received text-based SIP message and transmits a result of the analysis to the multilink section.

(Supplementary note 4) An SIP terminal control method for a system including a master main device and one or more slave main devices connected to the master main device, the method including: generating, in the master main device, a plurality of multilink sections each corresponding to the master main device or to each of the slave main devices; generating, in the master main device and each of the slave main devices, an SIP terminal connecting section which connects one or more SIP terminals; connecting the multilink sections and the SIP terminal connecting sections each other through an SIP link; causing the multilink sections to operate by using a CPU of the master main device; causing the SIP terminal connecting sections each to operate by using a CPU of the slave main device in a case where the SIP terminal connecting section oneself is included in the slave main devices, and to operate by using a CPU of the master main devices in a case where the SIP terminal connecting section oneself is included in the master main device; and causing the each of SIP terminal connecting sections to connect, via the multilink section corresponding to each of the SIP terminal connecting sections, to a package/terminal management module and an input/output control module which are included in the master main device.

(Supplementary note 5) A non-transitory computer-readable recording medium that stores a program for allowing a computer to function as the multilink sections as supplemented in supplementary note 1.

(Supplementary note 6) A non-transitory computer-readable recording medium that stores a program for allowing a computer to function as the SIP terminal connecting sections as supplemented in any supplementary notes 1 to 3.

The present invention can be utilized for allowing one or more SIP terminals to be connected to a system including a plurality of main devices.

REFERENCE SIGNS LIST

101: Master main device
102-1: First slave main device
102-2: Second slave main device
103: SIP link
104-1 to 104-9: SIP terminal
201: CAPS/OPMS
203: IOCS
205-1, 205-2, 205-3: Multilink section
207: SIP terminal connecting section
209: Transmission-side processing section
211: Reception-side processing section
213: TCP/IP section

The invention claimed is:

1. A SIP terminal control system in a system including a master main device and one or more slave main devices connected to the master main device, comprising:
   a plurality of multilink sections which are included in the master main device, and are operated by using a CPU of the master main device, wherein one of the plurality of multilink sections corresponds to the master main device and the others of the plurality of multilink sections correspond to each of said one or more slave main devices, respectively; and
   a plurality of SIP terminal connecting sections, one of which is included in the master main device and the others of which are included in the slave main devices, and which are connected with one or more SIP terminals,
   wherein:
   the SIP terminal connecting section included in the master main device is linked with the multilink section corresponding to the master main device through a SIP link, and the SIP terminal connection sections included in said one or more slave main devices are linked with the multilink sections corresponding to the slave main devices, respectively, through the SIP link,
   each of the SIP terminal connecting sections is operated by using a CPU of the master main device without using CPUs of the slave main devices if the SIP terminal connecting section is included in the master main device, and by using the CPU of the slave main device without using the CPU of the master main device if the SIP terminal connecting section is included in the slave main device, and
   each of the SIP terminal connecting sections is connected, via the multilink section corresponding to the SIP terminal connecting section, to a package/terminal management module and an input/output control module which are included in the master main device to be controlled therefrom.

2. The SIP terminal control system according to claim 1, wherein
   the SIP terminal connecting sections each include at least a transmission-side processing section and a reception-side processing section, and
   the transmission-side processing section generates a SIP message composed of texts based on binary data transmitted from the corresponding multilink section.

3. The SIP terminal control system according to claim 2, wherein
   the reception-side processing section analyzes the received text-based SIP message and transmits a result of the analysis to the multilink section.

4. A non-transitory computer-readable recording medium that stores a program for allowing a computer to function as the multilink sections as claimed in claim 1.

5. A non-transitory computer-readable recording medium that stores a program for allowing a computer to function as the SIP terminal connecting sections as claimed in claim 1.

6. A SIP terminal control method for a system including a master main device and one or more slave main devices connected to the master main device, the method comprising:
   generating, in the master main device, a plurality of multilink sections, which are operated by using a CPU of the master main device, wherein one of the plurality of multilink sections corresponds to the master main device and the others of the plurality of multilink sections correspond to each of said one or more slave main devices, respectively;
   generating a plurality of SIP terminal connecting sections, one of which is included in the master main device and the others of which are included in the slave main devices, and which are connected with one or more SIP terminals;
   connecting the SIP terminal connecting section included in the master main device and the multilink section corresponding to the master main device through a SIP link, and connecting the SIP terminal connection sections included in said one or more slave main devices and the multilink sections corresponding to the slave main devices, respectively, through the SIP link;
   causing the SIP terminal connecting sections each to operate by using a CPU of the slave main device without using the CPU of the master main device if the SIP terminal connecting section is included in the slave main devices, and to operate by using the CPU of the master main device without using the CPUs of the slave main devices if the SIP terminal connecting section is included in the master main device; and
   causing the each of SIP terminal connecting sections to connect, via the multilink section corresponding to the SIP terminal connecting section, to a package/terminal management module and an input/output control module which are included in the master main device to be controlled therefrom.

* * * * *